United States Patent [19]
Berryhill

[11] 3,965,690
[45] June 29, 1976

[54] AIR WASHER PIPING

[75] Inventor: Robert A. Berryhill, Greensboro, N.C.

[73] Assignee: Austin-Berryhill, Inc., Greensboro, N.C.

[22] Filed: May 29, 1974

[21] Appl. No.: 474,336

[52] U.S. Cl.............. 62/121; 236/44 B; 261/115; 62/171
[51] Int. Cl.² .......................................... F28C 1/00
[58] Field of Search........... 236/44 B; 62/171, 121; 261/DIG. 34 X, 115 X

[56] References Cited
UNITED STATES PATENTS

| | | | |
|---|---|---|---|
| 1,955,406 | 4/1934 | Carrier | 261/115 |
| 1,962,572 | 6/1934 | Richardson | 62/91 |
| 2,048,851 | 7/1936 | Downs | 261/115 |
| 2,110,203 | 3/1938 | Crawford | 62/171 X |
| 2,152,251 | 3/1939 | Gay | 62/171 |

Primary Examiner—William E. Wayner
Attorney, Agent, or Firm—Cushman, Darby & Cushman

[57] ABSTRACT

A piping arrangement for an air washer is disclosed which enables the air washer to maintain constant dewpoint of air passing from the leaving side of the air washer. Chilled water is sprayed from a first manifold and is used to cool air to a required wet bulb temperature. The air is then passed through subsequent manifolds having spray nozzles which further humidify the air until the air reaches a required dewpoint temperature in a substantially saturated state.

8 Claims, 2 Drawing Figures

AIR WASHER PIPING

BACKGROUND OF THE INVENTION

A. Field of the Invention

This invention relates to air washers, and more particularly to an air washer with chilled water sprays and additional washer sprays which provide for a constant year-around dewpoint temperature in a conditioned area. Air washers using chilled water find their greatest popularity in large industrial air-conditioning installations such as textile and printing plants. Humidity control is important in such plants and the humidity can be adjusted conveniently by changing the temperature of the spray water. The air washer is a reasonably good filter of the air, it can cool the air by inexpensive evaporative cooling when conditions are favorable, and it can heat and humidify in conjunction with heating coils during winter operation.

In textile mills, yarn under tension is transported over high speed spindles and a decrease in the percent relative humidity of the air will cause the yarn to tangle or break or become sticky on the spindle. Such a condition results because of build-up of static electricity caused by the high speed rotation of the spindles. Thus, it is readily apparent that a means for providing constant temperature and humidity in a textile plant or the like is of extreme importance.

B. Brief Description of the Prior Art

It is known in the air washer art to introduce chilled water into an air washer through the washer spray pump suction pipe. The chilled water is sprayed by means of spray nozzles into an air stream which is passed through the air washer. A temperature control on the leaving side of the air washer is used to vary the amount of chilled water supplied to the washer spray pump suction pipe.

When the air washer is to be operated in the summer, chilled water is supplied to the washer spray pump suction pipe for cooling. The following example will illustrate how air can be cooled from a room temperature of 80°F to the required dewpoint of 60°F. Using 10 gpm of spray water per 1000 CFM of air, the chilled water must cool the spray water 4.3°F which gives 55.7°F spray water through which the air passes.

1000 CFM × 1.08 × 20°F = 21,600 BTU/hr.
10gpm × 500 × 4.32°F = 21,600 BTU/hr.

Thus, it may be readily appreciated that unless atomizers or external humidifers are used, it is not possible to have a room dewpoint temperature higher than the spray water temperature.

In. U.S. Pat. No. 2,110,203 there is disclosed an air conditioning system in which dehumidification is accomplished without the use of refrigerating system or dehydrating solutions. The dehumidification of air is accomplished by mixing fresh and return air which is then passed through a spaced set of spray nozzles. The result is an air stream having certain portions with a relatively high dewpoint temperature and other portions with a relatively low dry bulb temperature. Intimate commingling of this air stream results in the formation of a fine mist or fog due to the condensation of moisture from that portion of the stream having a relatively high dewpoint temperature. The air stream is then passed through proper eliminator baffles to remove the fog or condensation and the conditioned air is passed to the delivery system. U.S. Pat. No. 2,110,203 does not set forth the novel structure of applicant's invention which maintains room temperature at a constant dewpoint year-around.

An apparatus for controlling humidity is described in U.S. Pat. No. 1,955,406. In this patent, there is disclosed a system by which humidity can be controlled in connection with an air washer by simultaneously varying the surface and the distribution of the spray and, at the same time, modifying the spray temperature so that the latent heat content may be modified without changing the final heat content of the air or the sensible heat content of the air may be modified without changing the final moisture content or latent heat content of the air.

In U.S. Pat. Reissue No. 20,944 there is set forth an air conditioning system directed to an air washer which is used to reduce the absolute humidity of air in industrial processes and for maintaining conditions in auditoriums and other places of public assembly. In this patent, a plurality of manifolds having spray nozzles are arranged in an air washer wherein a partition is used to control the mixing of air into a mixing chamber. There is no disclosure in U.S. Pat. Reissue Pat. No. 20,944 of an apparatus for maintaining constant room dewpoint year-around.

While the above mentioned patents disclose embodiments of an air washer utilizing more than one spray manifold, none of the above patents sets forth a structure in which an initial spray is used to cool the air to a certain wet bulb line, the air then being adiabatically cooled to a desired room dewpoint so that the leaving air is almost 100 percent in a saturated condition. This saturated condition is required in textile mills where yarn is being transported over high speed spindles.

SUMMARY OF THE INVENTION

It is therefore an object of the present invention to provide an air washer which maintains constant room dewpoint in a conditioned space throughout the year.

It is another object of the present invention to provide an air washer which maintains constant room dewpoint in which the air leaving the washer is in a saturated state.

It is another object of the present invention to provide an air washer in which chilled water is sprayed from a first manifold and is used to cool air to a required wet bulb temperature. The air is then passed through subsequent manifolds having spray nozzles which further humidify the air until it is substantially in a saturated state.

Still another object of the present invention is to provide for a means by which an air washer can be readily converted into a system which maintains constant room dewpoint.

A still further object of the present invention is to provide an air washer which does not require the spray water to be throttled in order to run efficiently.

Additional objects of the present invention reside in the specific construction of the exemplary apparatus hereinafter particularly described in the specification and shown in the several drawings.

BRIEF DESCRIPTION OF THE DRAWINGS

Novel features of the improved air washer in accordance with the present invention will be more readily understood from a consideration of the following description, taken together with the accompanying drawings, in which a certain preferred adaptation is illustrated with the various parts thereof identified by suit

DETAILED DESCRIPTION OF THE INVENTION

Figure 1:
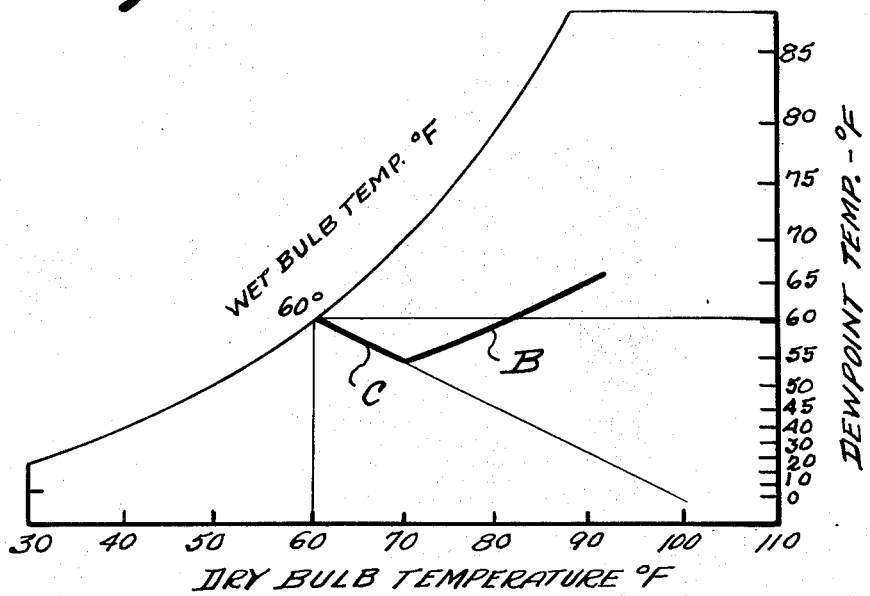
- FIG. 1 is a psychrometric chart illustrating the condition of air passed through the air washer of the present invention.

In accordance with the objects of the present invention and with reference to the drawings of FIGS. 1 and 2, the operation of the air washer of the present invention will now be hereinafter particularly described.

An air washer generally designated at 10 utilizes chilled water piping 12 and 12a which leads to manifold 14. Manifold 14 is provided with a plurality of spray nozzles or heads 16. A control valve 18 is operatively connected by well known means to temperature controller 20 which is located on the leaving side of washer 10. Chilled water is supplied through valve 18 and manifold 14 by means of an external chiller (not shown). A second group of headers 24 and 26 are connected by means of piping 28, 28a, 28b and 28c to a pump 30. Pump 30 is used to re-circulate water contained within sump 22. A chilled water return pipe 32 draws water from sump 22 and returns it to the chiller.

Manifolds 24 and 26 are also provided with spray nozzles or heads 16a. Outside air dampers 34 and return air dampers 36 are used in a conventional way to control the amount of outside and return air which passes through air washer 10.

The operation of the air washer of the present invention is as follows. To maintain a dewpoint of 60°F in winter, temperature controller 20 modulates dampers 34 and 36 to mix outside and return air which is then passed through the air washer with spray water from manifolds 24 and 26 being at 60°F. The problem arises in the summertime when it is desired to maintain a conditioned area at a constant dewpoint wherein the leaving air is extremely humid or almost completely saturated. As set forth in a previous example, it was illustrated that a room dewpoint higher than the spray water temperature cannot be achieved unless atomizers are employed. With the piping arrangement as illustrated in FIG. 2, it is now possible to automatically control the air leaving the washer at a constant dewpoint the year-around. For instance, the dewpoint can be maintained at 60°F unlike the dewpoint of 55.7°F of the example. As is known in the art, the dewpoint of air having any given moisture content is the temperature at which the air reaches a state of saturation when cooled. Thus, when air is cooled to its dewpoint, moisture begins to condense. As is also known in the art, the wet bulk temperature and the dry bulb temperature at the dewpoint are the same. Thus, in the present invention the air leaving the washer is at a dry bulb temperature which is equal to the wet bulb temperature at all times and under all conditions.

Figure 2:
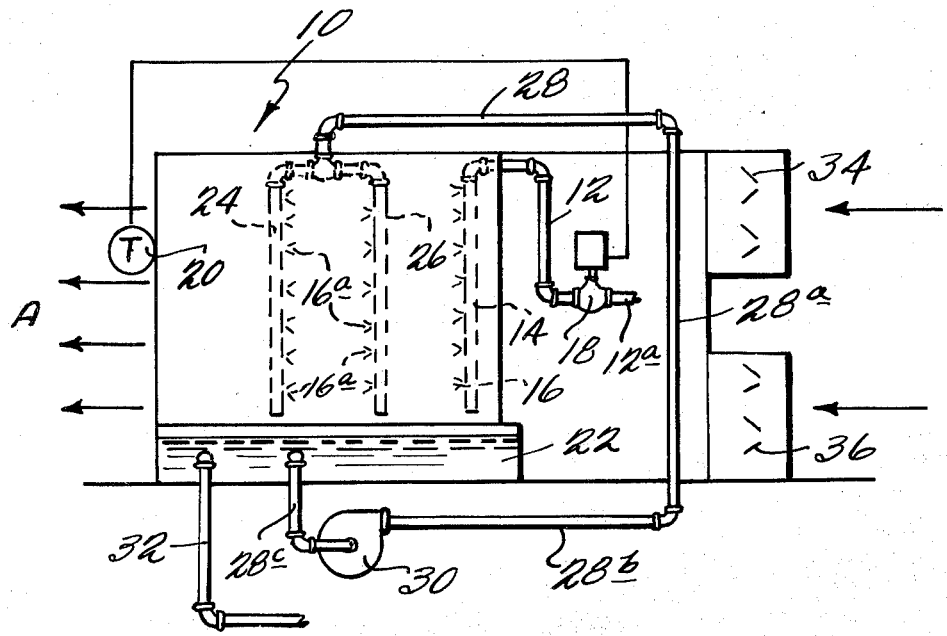
FIG. 2 is a side-view of an air washer and illustrates the piping arrangement.

From a consideration of FIGS. 1 and 2, it can be seen that air initially passing over manifold 14 in the direction of arrow A will be cooled by the chilled water spray from nozzles 16, and may be cooled to 60°F wet bulb as shown by cooling line B of FIG. 1. The air then passes over manifolds 24 and 26 and is cooled and humidified by water from sump 22 re-circulated by pump 30. From a consideration of the psychrometric chart of FIG. 1, it can be seen that the air is thereby humidified and cooled up wet bulb line C which represents the wet bulb temperature of 60°F. Thus, as is known in the art, when air below saturation is brought into intimate contact with water, there is always a tendency for some of the water to vaporize adding to the moisture content of the air. If no heat is added from an outside source, the heat of vaporization for the added moisture will be supplied entirely at the expense of the heat of the air and of the superheat of the original quantity of water vapor. The evaporation of moisture and the lowering of the air temperature will continue until the air becomes saturated with water vapor. Such a process is termed adiabatic and the final temperature, which in the present example is 60°F., is termed the temperature of adiabatic saturation. The system is designed so that when the air passes on the leaving side of the washer, the air is at a substantially saturated state corresponding to 60°F wet bulb.

Because of the present invention, air leaving the washer can be controlled at a dewpoint automatically the year-around without recalibrating the dewpoint controller. In the present state of the art, the dewpoint changes each time the system is changed from summer to winter or winter to summer. As a consequence, the dewpoint controller must be recalibrated in order to maintain a certain dewpoint. Another method is to throttle the spray water to make the washer inefficient and also re-adjust the dewpoint thermostat. When the chilled water is turned off in the winter the washer becomes more efficient and the dewpoint then rises. The dewpoint controller then has to be manually changed back down to the desired dewpoint.

The present invention offers a solution to the above disadvantages, and the additional piping may be advantageously adapted to existing air washers. It is now possible to maintain a constant room dewpoint without changing or recalibrating a dewpoint controller. Furthermore, the required dewpoint is held constant which insures that the desired temperature and relative humidity in a conditioned area is constant, the importance of which has been illustrated in the reference to textile mills.

While the invention has been particularly shown and described with reference to the foregoing referred embodiment thereof, it will be understood by those skilled in the art that other changes and formed in detail may be made therein without departing from the spirit and scope of the invention as defined in the appended claims.

What is claimed is:

1. An air washer for maintaining a substantially constant year-around dewpoint of air passing from the leaving side of the air washer comprising:
   a first chilled water spray means for initially contacting air passing through the washer, said first spray means cooling the air to a desired wet bulb temperature;
   a sump for receiving water from said spray means after said water from said spray means has passed through said air;
   thermostat means located at the leaving side of the air washer for controlling the temperature of the water in said sump;
   second spray means for contacting the air after the air has passed from said first spray means, the water passing through said second spray means being at the temperature of the water in said sump to cool and humidify the air to a substantially saturated state at a substantially constant wet bulb temperature to a predetermined dewpoint temperature; and means for pumping water from said sump to said second spray means.

2. The air washer of claim 1 wherein said means for controlling the temperature of the water in said sump comprises a control valve in a chilled water circuit leading to said first spray means, and means connecting said thermostat to said control valve for modulating the flow of chilled water to said first spray means so that said air passing from said first spray means is at a predetermined wet bulb temperature before being passed through said second spray means.

3. The air washer of claim 2 wherein outside air dampers and return air dampers are disposed on the entering side of said washer for control of outside air and return air entering said air washer.

4. An air washer for maintaining a constant year-around saturated dewpoint of air passing from the leaving side of the air washer comprising:

a first chilled water spray means for initially contacting air passing through the washer, said first spray means cooling the air to a desired wet bulb temperature;

thermostatic means for controlling the temperature of air passing from the leaving side of said washer;

a sump for receiving water from said spray means after said water has passed through said air;

second spray means for contacting the air after the air has passed from said first spray means, the water from said second spray means being at a temperature to cool and humidify the air to a substantially saturated state at a substantially constant wet bulb temperature to a predetermined dewpoint temperature; and means for pumping water from said sump to said second spray means.

5. In an air washer, a method of maintaining a substantially constant year-around dewpoint of air passing from the leaving side of the washer comprising the steps of:

initially cooling the air passing through said washer to a predetermined wet bulb temperature by spraying chilled water into contact with said air, subsequently cooling and humidifying said air to a substantially saturated state at a substantially constant wet bulb temperature to a predetermined dewpoint temperature by spraying said cooled air with chilled water, and controlling the temperature of the air passing from the leaving side of said washer by controlling the quantity of said chilled water sprayed into said air for initially cooling said air.

6. In an air washer a method of maintaining a substantially constant year-around dewpoint of air passing from the leaving side of the washer comprising the steps of:

initially cooling air passing through said washer to a predetermined wet bulb temperature by spraying chilled water into contact with said air and cooling and humidifying said air to a substantially saturated state at a substantially constant wet bulb temperature to a predetermined dew point temperature by spraying said cooled air with said chilled water after said chilled water has initially passed through said air, and controlling the temperature of the air passing from the leaving side of said washer by controlling the temperature of the sprayed water for cooling and humidifying said initially cooled air.

7. The method of claim 5 wherein the temperature controlling step further comprises the step of modulating the flow of said chilled water so that air passing through said air washer is at a predetermined wet bulb temperature after initially being sprayed with chilled water and before subsequently being sprayed to cool and humidify the air to a predetermined dew point temperature.

8. The method of claim 6 further comprising the step of controlling outside air dampers and return air dampers to control the relative quantity of outside air and return air passing through said washer.

* * * * *